United States Patent
Nash et al.

(10) Patent No.: US 11,801,922 B2
(45) Date of Patent: Oct. 31, 2023

(54) GYROSCOPIC STABILIZER

(71) Applicant: Kinetrol Limited, Surrey (GB)

(72) Inventors: John Nash, Surrey (GB); George Nash, Surrey (GB)

(73) Assignee: KINETROL LIMITED, Surrey (GB)

( * ) Notice: Subject to any disclaimer, the term of this patent is extended or adjusted under 35 U.S.C. 154(b) by 106 days.

(21) Appl. No.: 17/410,571

(22) Filed: Aug. 24, 2021

(65) Prior Publication Data

US 2022/0063775 A1 Mar. 3, 2022

(30) Foreign Application Priority Data

Aug. 25, 2020 (GB) .................................... 2013259

(51) Int. Cl.
*B63B 39/04* (2006.01)
*G01C 21/18* (2006.01)

(52) U.S. Cl.
CPC .............. *B63B 39/04* (2013.01); *G01C 21/18* (2013.01)

(58) Field of Classification Search
CPC ......... Y10T 137/7785; Y10T 137/7869; Y10T 74/12; Y10T 74/1257; Y10T 74/1282; B63B 39/04; B63B 39/005; F15B 15/12; F16F 9/145
USPC ................................................ 137/498, 517
See application file for complete search history.

(56) References Cited

U.S. PATENT DOCUMENTS

| | | | |
|---|---|---|---|
| 6,082,507 A | 7/2000 | Foerster | |
| 10,794,699 B2 | 10/2020 | Miocevich et al. | |
| 10,989,534 B2 | 4/2021 | Miocevich et al. | |
| 2017/0370443 A1 | 12/2017 | Nohara et al. | |
| 2018/0051988 A1 | 2/2018 | Miocevich et al. | |
| 2020/0400432 A1 | 12/2020 | Miocevich et al. | |

FOREIGN PATENT DOCUMENTS

| | | | |
|---|---|---|---|
| DE | 3718858 | 12/1988 | |
| WO | WO 2009/049371 | 4/2009 | |
| WO | WO-2009049371 A1 * | 4/2009 | ............. B63B 39/04 |

OTHER PUBLICATIONS

GB Search Report for GB2013259.3 dated May 26, 2021.

* cited by examiner

*Primary Examiner* — Randell J Krug
(74) *Attorney, Agent, or Firm* — Stephen J. Weyer, Esq.; Stites & Harbison, PLLC

(57) ABSTRACT

A gyroscopic stabiliser for stabilising motion of an object includes a support for attaching to the object, a gimbal rotatably supported by the support to be rotatable around a first axis, a flywheel rotatably supported by the gimbal to be rotatable around a second axis relative to the gimbal, orthogonal to the first axis, and a rotary damper. The rotary damper has a chamber containing a damping fluid a vane that is rotatable within the chamber and that is coupled to the gimbal and a flow passage allowing flow of the damping fluid from the chamber on one side of the vane to the chamber on the other side of the vane when the vane is rotated.

17 Claims, 6 Drawing Sheets

GYROSCOPIC STABILIZER

FIELD OF THE INVENTION

The present invention relates to a gyroscopic stabiliser for stabilising motion of an object, for example rolling or pitching motion of a marine vessel.

BACKGROUND OF THE INVENTION

Rolling motion of a marine vessel corresponds to rotation of the marine vessel around a longitudinal axis (front-to-back axis, or fore to aft axis) of the marine vessel. In other words, rolling motion of a marine vessel corresponds to side-to-side rotation of the marine vessel.

Pitching motion of a marine vessel corresponds to rotation of the marine vessel around a transverse axis (side-to-side axis, or port to starboard axis) of the marine vessel. In other words, pitching motion of a marine vessel corresponds to front-to-back rotation of the marine vessel.

Rolling and pitching motion of a marine vessel are generally caused by the interaction of the marine vessel with waves. Rolling or pitching motion of a marine vessel can cause sea sickness in passengers of the marine vessel, and therefore is generally undesirable.

It is known to provide a marine vessel with a gyroscopic stabiliser to stabilise rolling or pitching motion of the marine vessel. Such a gyroscopic stabiliser is known from US2017/0370443A1, for example, which is incorporated herein by reference.

A schematic illustration of a typical gyroscopic stabiliser, similar to the gyroscopic stabiliser disclosed in US2017/0370443A1, is illustrated in FIG. 1.

As shown in FIG. 1, the typical gyroscopic stabiliser 1 comprises a frame 3 that can be attached to a marine vessel (not shown). A gimbal 5 is rotatably mounted within the frame 3 so as to be rotatable around a first axis A (a horizontal axis in FIG. 1) relative to the frame 3. Specifically, the gimbal 5 has two horizontal shafts 7 extending from opposite sides of the gimbal 5 along the first axis A. These shafts 7 are rotatably mounted in the frame 3 via first bearings 9 between the frame 3 and the shafts 7, such that the gimbal 5 can be rotated around the first axis A relative to the frame 3. This arrangement means that the gimbal 5 can only be rotated around the first axis A relative to the frame 3, i.e. the gimbal 5 cannot rotate around any other axis relative to the frame 3.

A flywheel 11 and flywheel shaft 13 are rotatably mounted inside the gimbal 5 via second bearings 15 between the gimbal 5 and the ends of the flywheel shaft 13, such that the flywheel 11 and flywheel shaft 13 are rotatable around a second axis B (a vertical axis in FIG. 1) relative to the gimbal 5. The second axis B is the longitudinal axis of the flywheel shaft 13 and is orthogonal to the first axis A.

An electric motor (not illustrated) is included in the gyroscopic stabiliser to drive the flywheel 11 and flywheel shaft 13 to rotate around the second axis B.

In use, the gyroscopic stabiliser is attached to a marine vessel with the first axis A aligned with the direction in which the marine vessel experiences the rolling or pitching motion that is to be reduced.

For example, when it is desired to reduce side-to-side (port to starboard) rolling of the marine vessel, the gyroscopic stabiliser is attached to the marine vessel with the first axis A aligned with the transverse direction (side-to-side direction or port to starboard direction) of the marine vessel.

When the flywheel 11 is caused to rotate by the motor, it has an angular momentum L given in equation (1) below, where I is the moment of inertia of the flywheel 11 and ω is the angular velocity of the flywheel 11:

$$L = I\omega \quad (1)$$

When the marine vessel experiences a rolling motion along the direction of the first axis A, for example due to a rolling torque applied to the marine vessel by waves, the marine vessel and therefore the gyroscopic stabiliser 1 experience an angular velocity φ around a third axis C orthogonal to the first axis A (out of the page in FIG. 1). Specifically, when the first axis A is aligned with the transverse direction (side-to-side direction or port to starboard direction) of the marine vessel, the third axis C corresponds to the longitudinal direction (front-to-back direction or fore to aft direction) of the marine vessel.

Well-known gyroscopic effects mean that the rolling of the marine vessel along the direction of the first axis A, combined with the angular momentum of the flywheel 11 due to it spinning around the second axis B, causes the gimbal 5 to precess (oscillate) around the first axis A with a precession rate ψ and angle θ. The precession rate ψ depends on the roll rate of the marine vessel along the direction of the first axis A.

Well known gyroscopic effects mean that the precession (oscillation) of the gimbal 5 around the first axis A causes a stabilising torque around the third axis C that opposes the rolling motion of the marine vessel. In other words, the stabilising torque acts in an opposite direction to the rolling torque that is causing the rolling motion. The rolling motion of the marine vessel is therefore partially suppressed, because at least some of the rolling torque is cancelled out by the stabilising torque, such that the resultant torque acting on the marine vessel is significantly reduced.

In this manner, the gyroscopic stabiliser 1 acts to reduce the rolling motion of the marine vessel along the direction of the first axis A.

As shown in FIG. 1, the gyroscopic stabiliser 1 further includes two dampers 17 that are coupled to each of the horizontal shafts 7, and which are located on the outside of the frame 3. The dampers 17 act to damp the precession rate ψ of the gimbal 5 relative to the frame 3. In particular, the dampers 17 provide a resistance to the relative motion between the frame 3 and the gimbal 5, to reduce the precession rate ψ of the gimbal 5 relative to the frame 3.

The magnitude T of the stabilising torque generated by the gyroscopic stabiliser 1 is given by equation (2):

$$T = L\psi \cos(\theta) \quad (2)$$

Therefore, by controlling the precession rate ψ of the gimbal 5 relative to the frame 3, the dampers 17 control the magnitude T of the stabilising torque. In particular, by providing the dampers 17, it is possible to prevent excessive stabilisation torques from being generated by the gyroscopic stabiliser 1.

Furthermore, if the precession angle θ becomes more than 90°, the gyro motion becomes unstable and can lead to increasing rolling motion rather than reducing the rolling motion. This can be prevented by providing the dampers 17, which can damp the precession such that the precession angle θ does not become more than 90°.

The purpose of the dampers 17 is therefore both to control the amount of stabilising torque that the gyroscopic stabiliser 1 delivers and to prevent the gyroscopic stabiliser 1 from turning into a roll amplifying device.

In US2017/0370443A1, the dampers 17 are passive rotary dampers that are configured so that a damping coefficient of the damper 17 increases according to an increase in the relative rotation velocity between the frame 3 and the gimbal 5 in such a manner as to provide the non-linear relationship between the output torque of the damper 17 and the angular velocity of the gimbal 5 illustrated in FIG. 5 of US2017/0370443A1.

A rotary damper typically comprises a housing that encloses a chamber that is filled with a damping fluid having a specific viscosity. A vane is pivotally mounted within the chamber so that the vane can rotate within the chamber, so as to sweep around inside the chamber. The vane partitions the chamber into two sub-chambers on opposite sides of the vane. A flow passage including a control orifice is formed between the two sub-chambers.

When the vane rotates to the left or the right within the chamber, the vane displaces the fluid within the chamber and forces the fluid through the control orifice. The relatively small size of the control orifice means that a significant pressure is required to force a significant amount of fluid through the control orifice. The rotary damper therefore provides resistance to rotation of the vane within the chamber.

The vane is connectable to the target object along the rotation axis of the target object, such that rotation of the target object causes rotation of the vane within the chamber. The rotary damper therefore provides resistance to rotation of the target object.

The control orifice is typically a narrowing in the flow passage having a fixed size. With such a control orifice, where the torque applied to the vane is greater, the pressure in the fluid displaced by the vane is greater, and the amount of fluid displaced through the control orifice between the two sub-chambers is greater. This means that the vane therefore rotates with a higher angular velocity when the torque applied to the vane is greater. The target object therefore also rotates with a higher angular velocity when the torque applied to the target object is greater.

In US2017/0370443A1, a shape of the control orifice is set such that the value of the damping coefficient increases as the angular velocity of the gimbal 5 increases, so as to provide the non-linear relationship between the output torque of the damper 17 and the angular velocity of the gimbal 5 illustrated in FIG. 5 of US2017/0370443A1, instead of a liner relationship between the output torque of the damper 17 and the angular velocity of the gimbal 5 as in previous rotary dampers.

SUMMARY OF THE INVENTION

As discussed above, the magnitude T of the stabilising torque generated by a gyroscopic stabiliser is given by equation (2):

$$T = L\dot{\psi}\cos(\theta) \quad (2)$$

where L is the angular momentum of the flywheel, $\dot{\psi}$ is the precession rate of the gimbal and $\theta$ is the precession angle.

The present inventors have realised that it can be advantageous for a gyroscopic stabiliser to provide the same magnitude of stabilising torque for different rolling torques applied to the gyroscopic stabiliser. In other words, it can be advantageous for the gyroscopic stabiliser to provide the same magnitude of stabilising torque when the rolling torque is relatively low (i.e. there would be relatively small rolling motion in the absence of the gyroscopic stabiliser) and when the rolling torque is relatively high (i.e. there would be relatively large rolling motion in the absence of the gyroscopic stabiliser).

In particular, the present inventors have understood that sea sickness is caused at both low and high wave amplitudes, and therefore high and low vessel roll rates. The present inventors have realised that if a relatively large stabilising torque is induced at low roll wave amplitudes, the vessel roll can be reduced to almost zero and hence sea sickness incidents can be correspondingly reduced. In contrast, if the stabilising torque varies in proportion to the vessel roll rate, then at low roll rates the stabilising torque is low and has little to no effect on the overall vessel roll, and therefore does not significantly reduce sea sickness incidents at low roll rates.

The present inventors have further realised that such a uniform stabilising torque can be achieved by controlling the precession rate $\dot{\psi}$ of the gyroscopic stabiliser to be the same for different rolling torques applied to the gyroscopic stabiliser.

The present inventors have further realised that a uniform precession rate $\dot{\psi}$ of the gyroscopic stabiliser can be achieved by providing the gyroscopic stabiliser with a rotary damper in which an angular velocity of the vane is the same for different torques applied to the vane by the gimbal.

The present inventors have further realised that a uniform angular velocity of the rotary damper can be achieved by providing the rotary damper with a flow valve that provides a constant flow of the damping fluid from one side of the vane to the other side of the vane when the vane is rotated, irrespective of the torque applied to the vane.

Therefore, at its most general the present invention relates to a gyroscopic stabiliser that includes a rotary damper for damping precession of the gyroscopic stabiliser, wherein the rotary damper includes a constant flow valve that provides a constant flow of damping fluid in the rotary damper for different torques applied to the vane of the rotary damper.

According to a first aspect of the present invention there is provided a gyroscopic stabiliser for stabilising motion of an object, the gyroscopic stabiliser comprising:

a support for attaching to the object whose motion is to be stabilised;

a gimbal rotatably supported by the support to be rotatable around a first axis relative to the support;

a flywheel rotatably supported by the gimbal to be rotatable around a second axis relative to the gimbal, the second axis being orthogonal to the first axis; and a rotary damper for damping rotation of the gimbal around the first axis relative to the support;

wherein the rotary damper comprises:

a chamber containing a damping fluid;

a vane that is rotatable within the chamber and that is coupled to the gimbal; and a flow passage allowing flow of the damping fluid from the chamber on one side of the vane to the chamber on the other side of the vane when the vane is rotated, wherein the flow passage comprises a flow valve configured to provide substantially the same flow rate of fluid through the flow passage for different torques applied to rotate the vane.

In particular, the gyroscopic stabiliser of the present invention includes a rotary damper for damping rotation of the gimbal around the first axis relative to the support, wherein the rotary damper includes a flow valve that provides substantially the same flow rate of fluid through the flow passage for different torques applied to rotate the vane.

Therefore, with the present invention, the angular velocity of the vane will be substantially the same for different torques applied to rotate the vane.

Since the vane is coupled to the gimbal, the angular velocity of the vane being substantially the same for different torques applied to rotate the vane means that the precession rate $\psi$ of the gyroscopic stabiliser will be substantially the same for different rolling torques applied to the gyroscopic stabiliser.

Furthermore, the precession rate $\psi$ of the gyroscopic stabiliser being substantially the same for different rolling torques applied to the gyroscopic stabiliser means that the stabilising torque provided by the gyroscopic stabiliser will be substantially the same for different rolling torques applied to the gyroscopic stabiliser.

The gyroscopic stabiliser according to the present invention may have any one, or, where compatible, any combination of the following optional features.

Stabilising motion of the object may mean reducing some or all of a motion of the object, for example some or all of a particular component of the motion of the object. For example, stabilising motion of the object may mean reducing oscillation of the object, such as pitching or rolling motion of the object.

The object may be any object that experiences unwanted motion, such as unwanted oscillation. For example, the object may be a vehicle such as a marine vehicle.

A support means any part that is suitable for being attached to an object whose motion is to be stabilised, and for rotatably supporting the gimbal. The support may comprise means for fixing the support to the object, such as one or more holes for receiving fastenings. Alternatively, fastening may be achieved using a separate fastening component, such as a bracket.

The support may be in the form of a frame or cage or housing or shell.

At its most general, a gimbal may be a pivoted support, that is pivoted relative to the support and that can rotatably support the flywheel.

The gimbal is rotatably supported by the support so as to be only rotatable around the first axis relative to the support. In other words, the gimbal cannot be rotated around any other axes relative to the support. The gimbal is therefore constrained to only be able to rotate around the first axis relative to the support. For example, this may be achieved by pivoting the gimbal relative to the support at two pivot points on opposite sides of the gimbal.

The flywheel is rotatably supported by the gimbal so as to be only rotatable around the second axis relative to the gimbal. In other words, the flywheel cannot be rotated around any other axes relative to the gimbal. The flywheel is therefore constrained to only be able to rotate around the second axis relative to the gimbal. For example, this may be achieved by pivoting the flywheel relative to the gimbal at two pivot points on opposite sides of the flywheel (above and below the flywheel).

The flywheel may be rotatably supported by the gimbal by one or more bearings arranged between the flywheel and the gimbal.

The support may comprise first and second support parts on opposite sides of the gimbal along the first axis.

The first and second support parts may be connected by one or more connecting parts. For example, the connecting parts may be struts, such as cylindrical struts.

The gimbal may be rotatably supported by the support by one or more bearings.

The flywheel may be connected to a flywheel shaft that rotates together with the flywheel. For example, the flywheel shaft may be fixed to a mid-point of the flywheel (when viewed along the second axis) and may extend perpendicularly to the flywheel along the second axis.

The gimbal may house, surround or enclose the flywheel.

The gimbal may be a casing, housing, shell or cage that encloses and/or surrounds the flywheel. The gimbal may also enclose and/or surround a flywheel shaft to which the flywheel is connected.

The gimbal may be rotatably supported by the support by one of more rotary connections between the gimbal and support.

Damping rotation of the gimbal around the first axis relative to the support may mean reducing an amplitude of the rotation of the gimbal (i.e. reducing the precession angle $\theta$), and/or reducing a precession rate $\psi$ of the rotation of the gimbal, and/or reducing an angular velocity of the rotation of the gimbal.

The rotary damper is a passive damper, which means that the damping provided by the rotary damper is not electronically controlled.

The chamber may be any space or void that is capable of containing the damping fluid.

Typically the chamber is enclosed by a housing.

A damping fluid may be any fluid that can be used to provide suitable resistance to rotation of the vane. Typically, a damping fluid is a high-viscosity fluid.

Typically, the vane is rotatably mounted within the chamber at one end of the vane, so that the vane is rotatable around the one end of the vane.

Rotation of the vane may cause the vane to sweep around inside the chamber.

Typically, the vane will partition the chamber into a first sub-chamber and a second sub-chamber on opposite sides of the vane.

The vane may alternatively be referred to as a blade, or a feather, or a plate, or a rotor.

The vane may have two opposite main surfaces that are substantially flat.

The vane may be substantially planar.

The vane may be configured (for example in terms of its shape and size) to substantially prevent the damping fluid from moving around the vane from the chamber on one side of the vane to the chamber on the other side of the vane when the vane is rotated.

For example, the vane may include a seal that provides a seal between an edge of the vane and an inner surface of a housing that houses the chamber.

A seal may be provided around a whole outer edge of the vane, or substantially a whole outer edge of the vane.

A shape of the vane may substantially match a cross-sectional shape of the chamber, so that the vane substantially prevents the damping fluid from moving around the vane from the chamber on one side of the vane to the chamber on the other side of the vane when the vane is rotated.

More generally, the rotary damper may be configured so that fluid flow between the outside of the vane and the inner surface of the housing is substantially prevented as the vane is rotated in the chamber, such that substantially no fluid can pass around the outside of the vane in the chamber when the vane is rotated in the chamber.

The vane being coupled to the gimbal means that the vane is rotatably coupled to the gimbal. In other words, the coupling between the vane and the gimbal means that the vane and the gimbal rotate together in synchronisation. In other words, the vane and the gimbal rotate together as one piece or part. The coupling may be a direct coupling. In other words, the vane may be directly connected to the gimbal. Alternatively the coupling may be an indirect coupling. In other words, the vane may be connected to the gimbal via one or more intermediate parts.

The vane being coupled to the gimbal may mean that the vane is connected, or attached, or fixed to the gimbal.

The flow passage is a passage, channel or pathway along which damping fluid can flow from the chamber on one side of the vane to the chamber on the other side of the vane when the vane is rotated.

The flow passage may be provided, at least in part, in a housing that houses the chamber, and/or in the vane.

The flow passage limits an amount of damping fluid that can flow from the chamber on one side of the vane to the chamber on the other side of the vane when the vane is rotated, and therefore provides resistance to the flow of the damping fluid and therefore to the rotation of the vane.

Preferably the flow passage is substantially, or entirely, the only way that fluid can pass from the chamber on one side of the vane to the chamber on the other side of the vane when the vane is rotated.

The flow valve may be a constant flow rate valve.

The flow valve may provide the same flow rate of fluid through the flow passage for different torques applied to rotate the vane.

Substantially the same flow rate may mean that the flow rate for one torque applied to the vane is within 10%, or 5%, or 1% of the flow rate for another torque applied to the vane.

The flow valve may provide the same flow rate of fluid through the flow passage for any torque applied to rotate the vane. Alternatively, the flow valve may provide the same flow rate of fluid through the flow passage for a predetermined range of torques applied to the vane. For example, the predetermined range of torques may be chosen to be appropriate for the application and use of the gyroscopic stabiliser. For example, the predetermined range of torques may be chosen to include an expected maximum torque and an expected minimum torque that will be applied to the vane during normal use of the gyroscopic stabiliser.

The torque is applied to the vane by the gimbal that is coupled to the vane.

The torque is applied to the gimbal due to known gyroscopic effects when the gyroscopic stabiliser experiences rolling along the first axis.

The gyroscopic stabiliser may comprise more than one rotary damper.

The gimbal may be pivotably supported by the support at pivot points on opposite sides of the gimbal, and a rotary damper may be coupled to the gimbal at, or adjacent to, each of the pivot points.

When the vane rotates within the chamber, the vane will displace the damping fluid within the chamber and force the damping fluid through the flow passage from the chamber on one side of the vane (in the direction in which the vane is moving) to the chamber on the opposite side of the vane. The flow valve in the flow passage provides substantially the same flow rate of fluid through the flow passage for different torques applied to rotate the vane.

Since the flow of fluid is restricted by the flow passage, there is resistance to the rotation of the vane, and rotation of the vane (and therefore the gimbal coupled to the vane) is damped.

Furthermore, since the flow valve in the flow passage provides substantially the same flow rate of fluid through the flow passage for different torques applied to rotate the vane, the angular velocity of the vane will be the same for different torques (for example for a predetermined range of torques) applied to rotate the vane.

The flow valve may comprise a fixed orifice and a variable orifice in series in the flow passage, wherein a change in a pressure differential across the fixed orifice causes a change in a size of the variable orifice.

A fixed orifice means an orifice having a fixed and unchanging size.

A variable orifice means an orifice with an adjustable size.

The term orifice may mean an opening or hole.

An increase in the pressure differential across the fixed orifice may cause a reduction in a size of the variable orifice.

In particular, flow of the damping fluid through the fixed orifice when the vane rotates will cause a higher pressure upstream of the fixed orifice and a lower pressure downstream of the fixed orifice.

When a higher torque is applied to rotate the vane, the pressure upstream of the fixed orifice will increase, therefore increasing the pressure differential across the fixed orifice.

This increased pressure differential would act to force more fluid through the fixed orifice, thereby increasing the flow rate of the fluid.

However, in the present case, the change in the pressure differential across the fixed orifice is applied to cause a change in the size of the variable orifice, for example by causing a deformation of the variable orifice, or displacement or deformation of a part that contributes to, or affects, or alters, the size of the variable orifice.

In particular, an increase in the pressure differential across the fixed orifice causes a decrease in the size of the variable orifice. Decreasing the size of the variable orifice provides an increased resistance to the flow of the fluid, acting to reduce the flow rate of the fluid.

Since the fixed orifice and variable orifice are arranged in series in the flow passage, the effect of the reduction in size of the variable orifice to reduce the flow rate can counteract the effect of the increased pressure upstream of the fixed orifice to increase the flow rate, such that the flow rate through the flow valve remains substantially unchanged even as the torque applied to the rotor is increased.

In particular, reducing a size of the variable orifice will increase the pressure downstream of the fixed orifice, which will reduce a pressure drop across the fixed orifice. This therefore counteracts the effect of the pressure increase upstream of the fixed orifice due to the increased torque.

Therefore, the flow rate through the flow valve may be substantially the same (or the same) for different torques applied to rotate the vane.

The fixed orifice may be an orifice plate, or a restriction plate.

The flow valve may comprise a displaceable member to which the pressure differential across the fixed orifice is applied.

A displaceable member may be any part that can be displaced by the pressure differential across the fixed orifice.

The displaceable member may alternatively be referred to as a displaceable part or a displaceable element.

The displaceable member is typically a solid, rigid part.

The displaceable member may be a piston.

Applying the pressure differential across the fixed orifice to the displaceable member comprises applying the pressure upstream (for example immediately upstream) of the fixed orifice to a first side of the displaceable member, and applying the pressure downstream (for example immediately downstream) of the fixed orifice to an opposite second side of the displaceable member. The displaceable member therefore experiences a pressure differential between the first and second sides of the displaceable member that is equal to (or substantially equal to) the pressure differential across the fixed orifice.

Applying the pressure upstream (for example immediately upstream) of the fixed orifice to the first side of the displaceable member may comprise the first side of the displaceable member being in fluid communication with a point upstream of the fixed orifice. For example, a fluid path may be provided from the point upstream of the fixed orifice to the first side of the displaceable member, so that damping fluid having the pressure upstream of the fixed orifice is in contact with the first side of the displaceable member.

Applying the pressure downstream (for example immediately downstream) of the fixed orifice to the second side of the displaceable member may comprise the second side of the displaceable member being in fluid communication with a point downstream of the fixed orifice. For example, a fluid path may be provided from the point downstream of the fixed orifice to the second side of the displaceable member, so that damping fluid having the pressure downstream of the fixed orifice is in contact with the second side of the displaceable member.

The pressure differential applied to the displaceable member causes a force to act on the displaceable member that acts to displace the displaceable member in a first direction.

For example, the resultant pressure difference between the pressure of the damping fluid at the first surface and the pressure of the damping fluid at the second surface causes a force to act on the displaceable member in the direction from the first surface to the second surface. This force acts to displace the displaceable member in the direction from the first surface to the second surface.

The displaceable member is biased in a second direction opposite to the first direction. Therefore, the biasing force acts to displace the displaceable member in the second direction.

The biasing force and the force due to the pressure differential therefore act in opposite directions.

The biasing of the displaceable member varies with displacement of the displaceable member.

The biasing force on the displaceable member increases as the displaceable member is displaced in the second direction. Therefore, while the pressure differential is constant, the displaceable member is displaced to a position where the biasing force balances the force due to the pressure differential.

If the pressure differential increases, due to an increased torque acting on the vane, the force on the displaceable member due to the pressure differential will also increase. The displaceable member will therefore be displaced in the second direction until the biasing force increases to balance the force due to the pressure differential.

Conversely, if the pressure differential decreases, due to a decreased torque acting on the vane, the force on the displaceable member due to the pressure differential will also decrease. The displaceable member will therefore be displaced in the first direction until the biasing force decreases to balance the force due to the pressure differential.

Displacement of the displaceable member may change a size of the variable orifice.

In particular, displacement of the displaceable member in a first direction when the pressure differential decreases may increase a size of the variable orifice, so that the variable orifice provides less resistance to fluid flow. Conversely, displacement of the displaceable member in a second direction when the pressure differential increases may decrease a size of the variable orifice, so that the variable orifice provides an increased resistance to fluid flow.

For example, the variable orifice may comprise a gap between an edge of the displaceable member and another surface, wherein displacement of the displaceable member changes the size of the gap. The another surface may be a surface of a housing that houses the chamber, for example.

Alternatively, the variable orifice may comprise a fixed opening, wherein displacement of the displaceable member changes an extent to which the displaceable member covers, or blocks, or closes the fixed opening.

The fixed orifice may be between a first region and a second region of the flow passage, and the displaceable member may be displaceable within (or along) a channel that connects the first region and the second region of the flow passage in parallel to the fixed orifice. Therefore, opposite surfaces of the displaceable member will experience the pressure upstream of the fixed orifice and downstream of the fixed orifice respectively.

The flow valve may comprise a biasing element that applies a biasing force to the displaceable member.

For example, the biasing force may be a resilient member.

The biasing element may be a spring.

The biasing element may apply a biasing force to the surface of the displaceable member that experiences the pressure downstream of the fixed orifice, so that the biasing force opposes the force on the displaceable member due to the pressure differential across the fixed orifice.

The biasing element may apply the biasing force to the second surface of the displaceable member.

The biasing force applied by the biasing element may be adjustable.

For example, where the biasing element is a spring, a tension of the spring may be adjustable by tightening or un-tightening the spring, for example by rotating one end of the spring while the other end is prevented from rotating.

The biasing force applied by the biasing element may be manually adjustable, for example by turning a nut or screw locating on an outside of the gyroscopic stabiliser.

The displaceable member may be linearly displaceable. For example, the displaceable member may be linearly displaceable along a linear channel or space.

The fixed orifice may be upstream of the variable orifice.

The vane may partition the chamber into a first sub-chamber and a second sub-chamber on opposite sides of the vane, and the flow passage may be between the first sub-chamber and the second sub-chamber.

The flow passage may be located in a body of a housing that houses the chamber.

Preferably the flow valve is a bi-directional flow valve that operates in the same way for fluid flow in either direction through the flow passage.

Therefore, the flow valve may be configured to provide substantially the same flow rate of fluid through the flow passage for different torques applied to rotate the vane for flow in either direction through the flow passage.

Therefore, when the vane is rotated in either direction, so that the damping fluid is pushed through the flow passage in either direction, the flow valve will provide substantially the same flow rate of fluid through the flow passage for different torques applied to rotate the vane.

For example, this may be achievable with a single flow valve comprising a specific arrangement of a fixed orifice and a variable orifice arranged in series as described above.

Alternatively, two of the flow valves discussed above arranged in opposite directions in the flow passage may be provided, to provide substantially the same flow rate of fluid through the flow passage for different torques applied to rotate the vane for flow in either direction through the flow passage.

For example, the first flow valve discussed above may be configured to provide substantially the same flow rate of fluid through the flow passage for different torques applied to rotate the vane for fluid flow in a first direction through the flow passage, and the flow passage may comprise a second flow valve configured to provide substantially the same flow rate of fluid through the flow passage for different torques applied to rotate the vane for fluid flow in an opposite second direction through the flow passage.

The second flow valve may have any, or any combination of, the features of the first flow valve discussed above.

Where each of the first and second flow valves includes the fixed orifice and the variable orifice in series, the order of the fixed orifice and the variable orifice in the second flow valve may be opposite to the order of the fixed orifice and the variable orifice in the first flow valve, along the flow passage.

For example, the order of the orifices along the flow passage may be as follows: fixed orifice of valve 1, variable orifice of valve 1, variable orifice of valve 2, and fixed orifice of valve 2.

The variable orifices of the first and second flow valves may be adjacent to each other.

Where each of the first and second flow valves includes the displaceable member, the displaceable members may be arranged on opposite sides of the same fixed opening.

The first flow valve may be configured not to restrict fluid flow in the second direction, and the second flow valve may be configured not to restrict fluid flow in the first direction.

For example, fluid flow in the second direction may displace the displaceable member of the first flow valve so that the size of the variable orifice of the first flow valve is a maximum.

Similarly, fluid flow in the first direction may displace the displaceable member of the second flow valve so that the size of the variable orifice of the second flow valve is a maximum.

In an alternative arrangement, the gyroscopic stabiliser may include only a single flow valve and a plurality of valves for connecting either:
  the chamber on a first side of the vane to an upstream side of the flow valve and the chamber on a second side of the vane to a downstream side of the flow valve; or
  the chamber on the second side of the vane to the upstream side of the flow valve and the chamber on the first side of the vane to the downstream side of the flow valve.

Therefore, flow of the damping fluid through the flow valve may always be in the same direction, regardless of whether the fluid is flowing from the chamber on the first side of the vane to the chamber on the second side of the vane, or from the chamber on the second side of the vane to the chamber on the first side of the vane.

The rotary damper may comprise:
  a first flow passage connecting the chamber on the first side of the vane to the upstream side of the flow valve;
  a second flow passage connecting the chamber on the second side of the vane to the upstream side of the flow valve;
  a third flow passage connecting the chamber on the first side of the vane to the downstream side of the flow valve; and
  a fourth flow passage connecting the chamber on the second side of the vane to the downstream side of the flow valve.

The plurality of valves may comprise a valve provided in each of the first to fourth flow passages.

The valves may all be one-way flow valves.

BRIEF DESCRIPTION OF THE DRAWINGS

Embodiments of the present invention will now be discussed, by way of example only, with reference to the accompanying Figures, in which.

DETAILED DESCRIPTION OF THE PREFERRED EMBODIMENTS AND FURTHER OPTIONAL FEATURES OF THE INVENTION

Aspects and embodiments of the present invention will now be discussed with reference to the accompanying figures. Further aspects and embodiments will be apparent to those skilled in the art.

Gyroscopic stabilisers according to embodiments of the present invention can be used to stabilise motion of an object. In one example application, the gyroscopic stabiliser may be used to reduce rolling or pitching motion of a marine vehicle, such as a boat or ship. However, the gyroscopic stabiliser may instead be used to stabilise motion of other types of vehicle, such as land or air vehicles, or other objects that may be subject to unwanted oscillations or movement.

Figure 1:
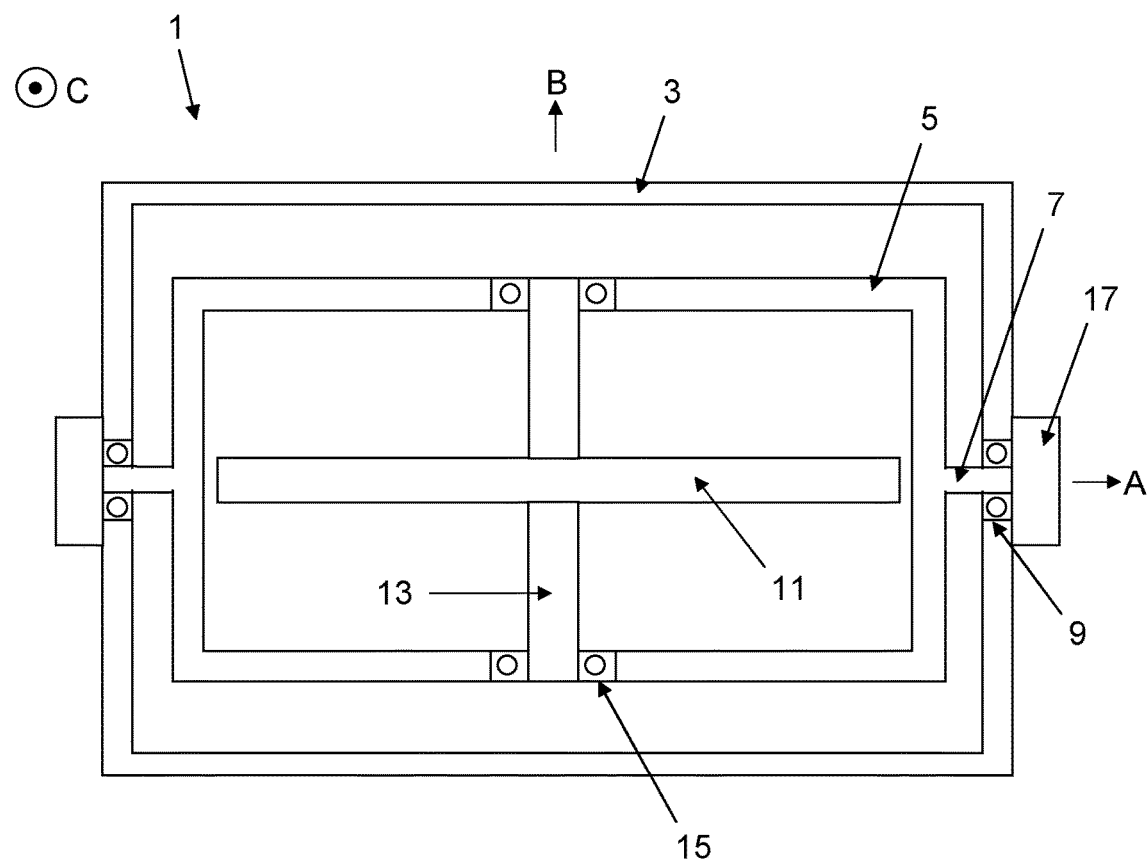
FIG. 1 is an illustration of a typical gyroscopic stabiliser.
Figure 2:
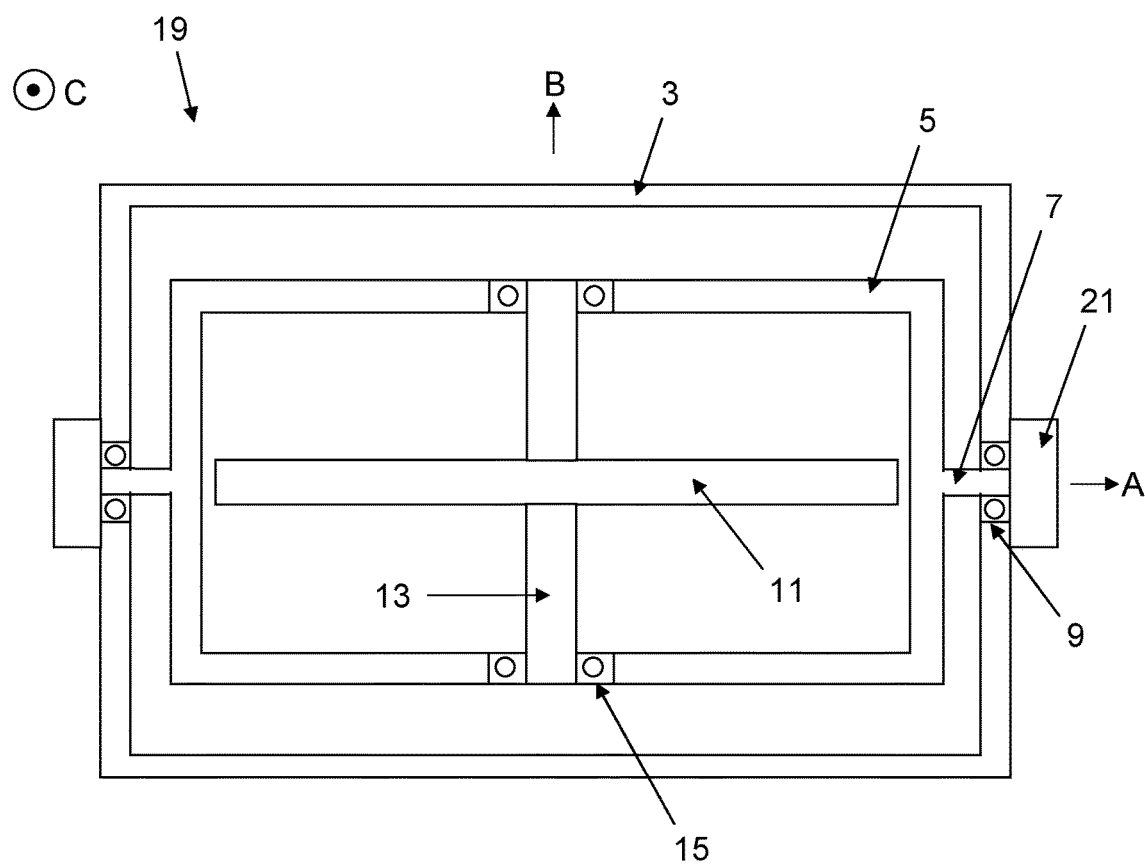
FIG. 2 is an illustration of a gyroscopic stabiliser according to an embodiment of the present invention.

FIG. 2 is an illustration of a gyroscopic stabiliser 19 according to an embodiment of the present invention. As shown in FIG. 2, the gyroscopic stabiliser 19 in this embodiment is the same as the gyroscopic stabiliser 1 in FIG. 1 with the exception that the rotary dampers 17 are replaced with the rotary dampers 21 in the present invention.

Parts of the gyroscopic stabiliser 19 in this embodiment that are the same as parts of the gyroscopic stabiliser 1 are indicated using the same reference numbers. These parts may therefore have any of the features described above with reference to FIG. 1. This description is not repeated here for conciseness.

More generally, the gyroscopic stabiliser 19 in this embodiment may have any of the features of the gyroscopic stabiliser 1 described above, unless incompatible with the features discussed below. This description is not repeated here for conciseness.

The rotary dampers 21 in the present invention each include a flow passage allowing flow of the damping fluid from the chamber on one side of the vane to the chamber on the other side of the vane when the vane is rotated, wherein the flow passage comprises a flow valve configured to provide substantially the same flow rate of fluid through the flow passage for different torques applied to rotate the vane.

Therefore, the rotary dampers 21 in the present invention provide a substantially uniform angular velocity of the vane for different torques applied to rotate the vane, and therefore a substantially uniform angular velocity of the gimbal 5 for different rolling torques applied to the gyroscopic stabiliser 19.

The precession rate ψ of the gyroscopic stabiliser 19 is therefore substantially the same for different rolling torques applied to the gyroscopic stabiliser 19.

Furthermore, the precession rate ψ of the gyroscopic stabiliser 19 being substantially the same for different rolling torques applied to the gyroscopic stabiliser 19 means that the stabilising torque provided by the gyroscopic stabiliser 19 will be substantially the same for different rolling torques applied to the gyroscopic stabiliser 19.

Of course, the configuration of the gyroscopic stabiliser 19 is not limited to the specific arrangement illustrated in FIG. 2.

For example, the shape of the frame (support) 3 and/or the gimbal 5 and/or the flywheel 11 may be different to those illustrated in FIG. 2. The shapes of the frame 3, gimbal 5 and flywheel 11 are not particularly limited in the present invention.

Furthermore, the manner in which the gimbal 5 is rotatably supported by the frame 3 may be different to that illustrated in FIG. 2. For example, the shafts 7 may be omitted and one or more bearings may be provided directly between the gimbal 5 and the frame 3. In one embodiment a slewing ring bearing may be provided between the gimbal 5 and the frame 3.

Furthermore, the manner in which the flywheel 11 is rotatably mounted in the gimbal 5 may be different to that illustrated to FIG. 2. For example, in some embodiments the flywheel shaft 13 may be omitted and one or more bearings may be provided directly between the flywheel 11 and the gimbal 5.

Furthermore, the positioning of the rotary dampers 21 may be different to that illustrated in FIG. 2. For example, the rotary dampers 21 may instead be positioned between the gimbal 5 and the frame 3, or inside the gimbal 5.

It is also not essential in the present invention for there to be two rotary dampers 21 as illustrated in FIG. 2. Instead, in an alternative embodiment only a single rotary damper 21 may be provided.

Where two rotary dampers 21 are provided, it is not essential for the two rotary dampers 21 to be identical, although this is preferred.

Figure 3:
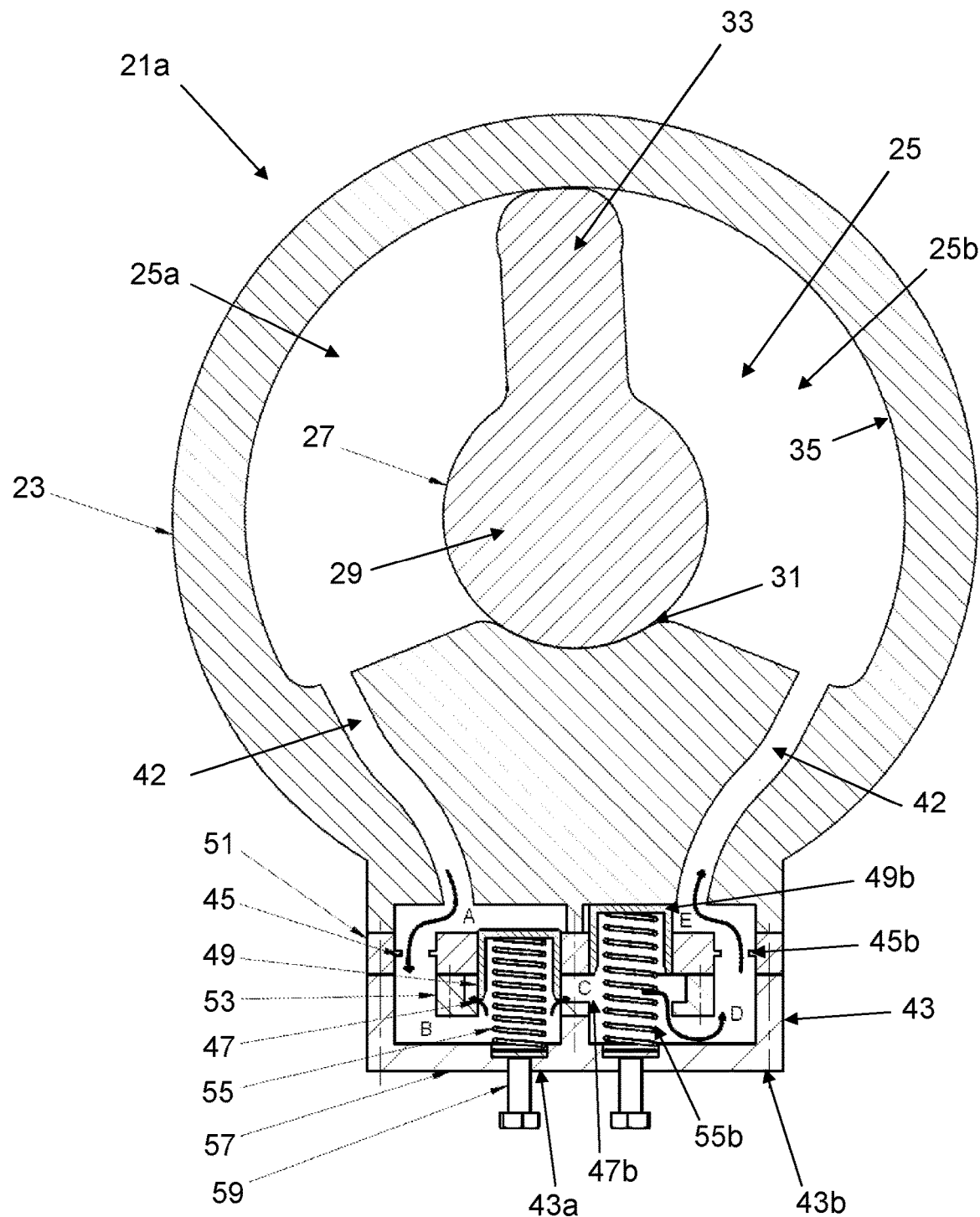
FIG. 3 is an illustration of a cross-sectional view of a first rotary damper that can be used in a gyroscopic stabiliser according an embodiment of the present invention.

A first example of a rotary damper 21a that can be used as the rotary damper 21 in the present invention is illustrated in FIG. 3.

As shown in FIG. 3, the rotary damper 21a comprises a housing 23 that encloses a chamber 25. The chamber 25 contains a damping fluid.

A vane 27 is rotatably mounted within the chamber 25 in the housing 23. In particular, the vane 27 is rotatably mounted at a first end 29 of the vane 27.

The first end 29 of the vane 27 has a substantially circular outer shape.

The first end 29 of the vane 27 is located adjacent to a first internal surface 31 of the housing 23 that has a curved shape that is complementary to (or that corresponds to) the substantially circular outer shape of the first end 29 of the vane 27.

The first internal surface 31 of the housing 23 and the first end 29 of the vane 27 are positioned close together, so that fluid flow between the first end 29 of the vane 27 and the first internal surface 31 of the housing 23 is substantially prevented. The complementary shapes of the first internal surface 31 and the first end 29 mean that the first end 29 can rotate relative to the first internal surface 31 while still substantially preventing fluid flow therebetween.

The vane 27 further comprises a blade portion 33 that extends from the first end 29. The blade portion 33 may be substantially flat.

The blade portion 33 extends from the first end 29 to a point adjacent to a second internal surface 35 of the housing 23.

The second internal surface 35 has a circular shape that corresponds to a circular shape swept out by a tip of the blade portion 33 when the vane 27 is rotated in the chamber 25.

The tip of the blade portion 33 and the second internal surface 35 are positioned close together, so that fluid flow between the tip of the blade portion 33 and the second internal surface 35 is substantially prevented as the vane 27 is rotated within the chamber 25.

Figure 4:
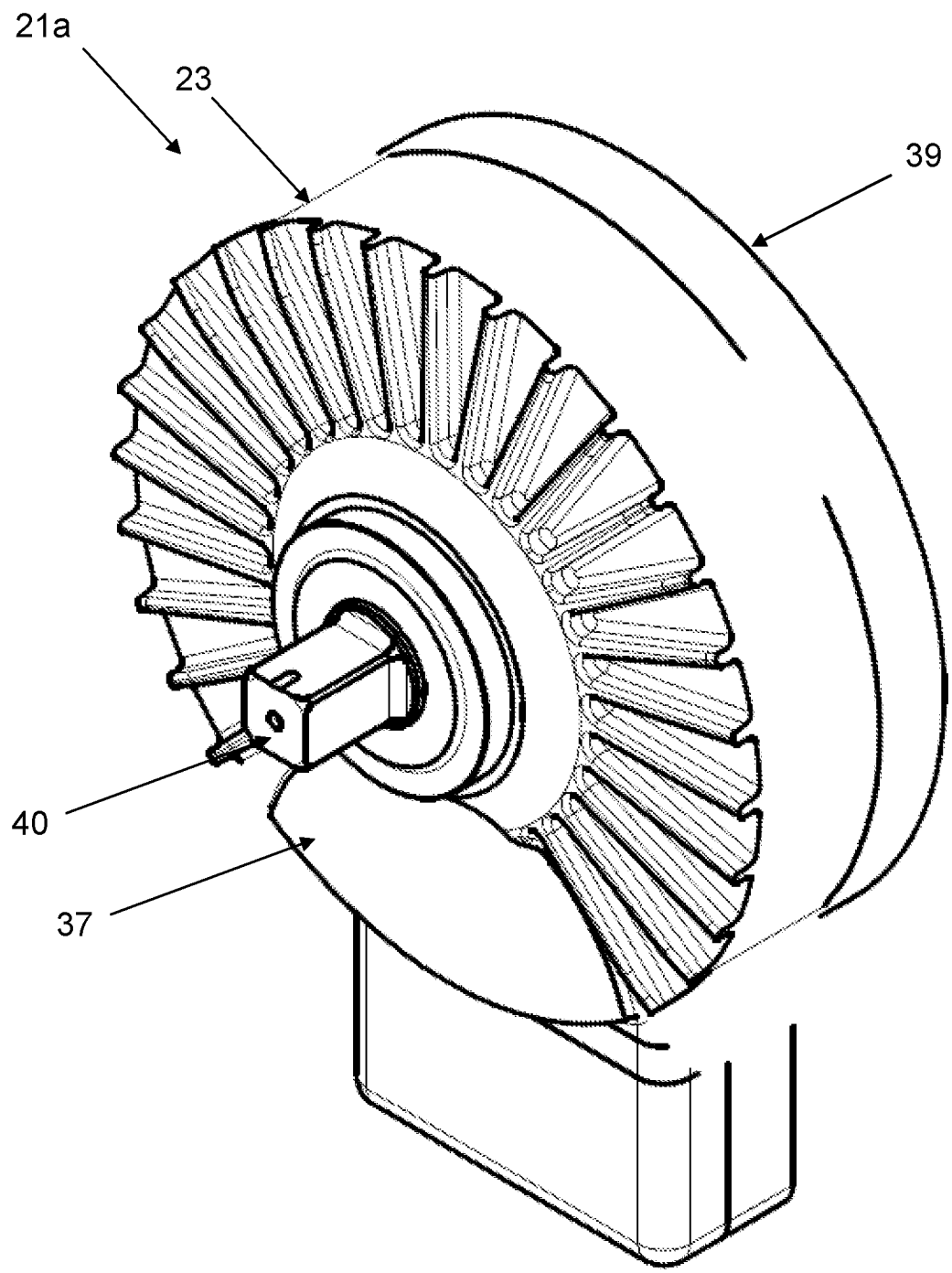
FIG. 4 is an illustration of a perspective view of the first rotary damper.

As shown in FIG. 4, the housing 23 may have substantially flat (or planar) front and back faces 37, 39 (the two main faces of the housing 23). The vane 27 may also have substantially flat top and bottom edges (surfaces perpendicular to an axis of rotation of the vane 27). The substantially flat top and bottom edges of the vane 27 may be positioned close to the substantially flat front and back faces 37, 39 respectively of the housing 23, so that fluid flow between the top edge of the vane 27 and the front face 37 of the housing 23 is substantially prevented as the vane 27 is rotated within the chamber 25, and so that fluid flow between the bottom edge of the vane 27 and the back surface 39 of the housing 23 is substantially prevented as the vane 27 is rotated within the chamber 25.

Therefore, fluid flow between the outside of the vane 27 and the housing 23 as the vane 27 is rotated in the chamber 25 may be substantially prevented.

More generally, the edges of the vane and the internal surfaces of the housing may have complementary or corresponding shapes.

In some embodiments, one or more seals may be provided to restrict fluid flow around the outside of the vane 27 as the vane 27 is rotated in the chamber 25.

Of course, in other embodiments the shape of the vane may be different to that illustrated in FIG. 3.

The vane 27 partitions the chamber 25 into a first sub-chamber 25a on one side of the vane 27 and a second sub-chamber 25b on the other side of the vane 27.

As shown in FIG. 4, a rotary shaft 40 extends from the housing 23. The rotary shaft 40 is fixed or connected to the vane 27, so that the rotary shaft 40 rotates with the vane 27 relative to the housing 23. The rotary shaft 40 is coupled or connected to the gimbal 5, so that the gimbal 5 rotates with the vane 27.

As shown in FIG. 3, the rotary damper 21a comprises a flow passage 42 that connects the first sub-chamber 25a and the second sub-chamber 25b, so that the damping fluid can flow from the first sub-chamber 25a to the second sub-chamber 25b when the vane 27 is rotated towards the first sub-chamber 25a, and so that the damping fluid can flow from the second sub-chamber 25b to the first sub-chamber 25a when the vane 27 is rotated towards the second sub-chamber 25b.

In particular, when the vane 27 is rotated within the chamber 25 towards the first sub-chamber 25a, the vane 27 will apply pressure to the damping fluid in the first sub-chamber 25a. This pressure will cause the damping fluid in the first sub-chamber 25a to flow through the flow passage 42 to the second sub-chamber 25b, which will be at a lower pressure than the first sub-chamber 25a. The greater the torque applied to rotate the vane 27 towards the first sub-chamber 25a, the greater the pressure will be in the first sub-chamber 25a.

The flow passage 42 is formed inside the housing 23.

The flow passage 42 includes a constant flow valve 43 that provides a constant flow of fluid through the flow passage 42 when the vane 27 is rotated in either direction, for different torques applied to rotate the vane 27.

The constant flow valve 43 includes a first constant flow valve 43a and a second constant flow valve 43b.

The first constant flow valve 43a provides a constant flow of fluid through the flow passage 42 when the vane 27 is rotated towards the first sub-chamber 25a.

The second constant flow valve 43b provides a constant flow of fluid through the flow passage 42 when the vane 27 is rotated towards the second sub-chamber 25b.

As shown in FIG. 3, the first constant flow valve 43a includes a fixed orifice 45 and a variable orifice 47 arranged in series along the flow passage 42. When fluid is flowing from the first sub-chamber 25a to the second sub-chamber 25b, the fixed orifice 45 is upstream of the variable orifice 47.

The fixed orifice 45 is a narrowing in the flow passage 42 formed by an annular protrusion in the flow passage 42. The fixed orifice 45 may be formed by an orifice plate.

The fixed orifice 45 is located between a first region A and a second region B on the flow path. The first region A is upstream of the fixed orifice 45 and the second region B is downstream of the fixed orifice 45 when the fluid is flowing from the first sub-chamber 25a to the second sub-chamber 25b.

When damping fluid flows through the flow passage 42 from the first sub-chamber 25a to the second sub-chamber 25b, the flow of damping fluid through the fixed orifice 45 causes the fluid pressure in the first region A to be higher than the fluid pressure in the second region B.

The first constant flow valve 43a further comprises a piston 49 that is linearly moveable along a channel that extends between the first region A and the second region B in parallel to the flow passage through the fixed orifice 45.

The channel is formed between a first housing part 51 and a second housing part 53.

The piston 49 substantially seals the channel, such that the damping fluid cannot flow from the first region A to the second region B along the channel around the piston 49.

A first surface of the piston 49 is in fluid communication with the first region A, and therefore the fluid pressure in the first region A acts on the first surface of the piston 49. An opposite second surface of the piston 49 is in fluid communication with the second region B, and therefore the fluid pressure in the second region B acts on the second surface of the piston 49.

Since the pressure in the first region A is greater than the pressure in the first region B when the vane 27 is rotated towards the first sub-chamber 25a, a pressure differential exists between the first surface of the piston 49 and the second surface of the piston 49. This pressure differential causes a force to be applied to the piston 49 that acts in a first direction from the first surface towards the second surface. This force acts to displace the piston 49 along the channel in the first direction.

As shown in FIG. 3, the first constant flow valve 43a comprises a spring 55 that is positioned between a bottom surface 57 of the housing and the second surface of the piston 49.

The spring 55 applies a biasing force to the second surface of the piston 49 that acts to displace the piston 49 in a second direction from the second surface towards the first surface, that is opposite to the first direction.

The biasing force applied to the second surface of the piston 49 by the spring 55 increases as the piston 49 is displaced in the first direction, and decreases as the piston is displaced in the second direction, due to a changing amount of compression of the spring 55.

When the vane 27 is being rotated towards the first sub-chamber 25a with a constant torque applied to the vane 27, the pressure differential across the fixed orifice 45, and therefore the pressure differential between the first and second surfaces of the piston 49, will be constant. The force acting to displace the piston 49 in the first direction due to the pressure differential will therefore also be constant.

In this case, the piston 49 will be displaced along the channel in the first direction until the biasing force applied to the piston 49 by the spring 55 in the second direction balances the force acting to displace the piston 49 in the first direction.

As shown in FIG. 3, the variable orifice 47 is formed between a bottom edge of the piston 49 and an internal surface of the housing 23. As the piston 49 is displaced in the second direction, the size of the variable orifice 47 is increased (because the bottom edge of the piston 49 and the internal surface of the housing 23 move further apart). Conversely, as the piston 49 is displaced in the first direction, the size of the variable orifice 47 is decreased (because the bottom edge of the piston 49 and the internal surface of the housing 23 move closer together).

When the torque applied to rotate the vane 27 is increased, the pressure differential across the fixed orifice 45 will increase. In other words, the pressure difference between the first region A and the second region B will increase.

In isolation, this increased pressure difference would increase the flow rate of the fluid through the fixed orifice 45.

However, the increased pressure difference between the first region A and the second region B also causes a greater force to act on the piston 49 in the first direction. This greater force causes the piston 49 to be displaced in the first direction until the biasing force applied to the piston 49 in the second direction by the spring 55 increases to balance the greater force in the first direction. Displacement of the piston 49 in the first direction causes the size of the variable orifice 47 to decrease, because the bottom edge of the piston 49 moves closer to the internal surface of the housing 23.

The reduction in size of the variable orifice 47 reduces the flow rate through the variable orifice 47, which increases the pressure in region B downstream of the fixed orifice 45 and therefore decreases the pressure drop across the fixed orifice 45.

This decrease in the pressure difference between the first region A and the second region B causes the piston 49 to move back in the first direction to increase the size of the variable orifice 47, thereby increasing the size of the variable orifice 47.

The first constant flow valve 43a reaches an equilibrium when the force acting on the piston 49 in the first direction due to the pressure differential and the force acting on the piston 49 in the second direction due to the spring 55 are in balance.

The constant flow rate provided by the first constant flow valve 43a, and therefore the constant angular velocity of the vane 27, are therefore controlled by the tension in the spring 55.

As shown in FIG. 3, the first constant flow valve 43a further includes an adjustment mechanism in the form of knob or nut 59 that can be manually rotated to change the tension in the spring 55.

As shown in FIG. 3, when fluid flows through the flow passage 42 from the second sub-chamber 25b to the first sub-chamber 25a, the fluid flows through the fixed orifice 45 in the opposite direction, so that the pressure in the second region B is therefore greater than the pressure in the first region A.

Therefore, the pressure applied to the second surface of the piston 49 is greater than the pressure applied to the first surface of the piston 49, and the force due to the pressure differential therefore acts in the second direction, which is the same direction as the force applied to the piston 49 by the spring.

The piston 49 is therefore displaced to its maximum extent in the second direction so that the size of the variable orifice 47 is a maximum.

As such, the first constant flow valve 43a essentially does not restrict flow of the fluid from the second sub-chamber 25b to the first sub-chamber 25a.

As shown in FIG. 3, the second constant flow valve 43b includes the same parts as the first constant flow valve 43a. These parts are given the same reference numbers but with the addition of "b" to help differentiate them. These parts may have any of the features of corresponding parts of the first constant flow valve 43a discussed above.

Essentially, the second constant flow valve 43b corresponds to the first constant flow valve 43a connected the opposite way around, i.e. with the fixed orifice 45b closer to the second sub-chamber 25b on the flow passage 42 than to the first sub-chamber 25a.

This means that when the vane 27 is rotated towards the second sub-chamber 25b, the second constant flow valve 43b functions in exactly the same way that the first constant flow valve 43a operates when the vane 27 is rotated towards the first sub-chamber 25a.

The second constant flow valve 43b therefore provides a constant flow of fluid through the flow passage 42 when the vane 27 is rotated towards the second sub-chamber 25b, for different torques applied to rotate the vane 27.

In addition, similarly to the first constant flow valve 43a, when the vane 27 is rotated towards the first sub-chamber 25a the piston 49b is displaced to its maximum extent in the second direction so that the size of the variable orifice 47b is a maximum.

As such, the second constant flow valve 43b essentially does not restrict flow of the fluid from the first sub-chamber 25a to the second sub-chamber 25b.

As shown in FIG. 3, the pistons 49 and 49b of the first and second constant flow valves 43a, 43b are arranged on opposite sides of the same fixed opening.

Figure 5:
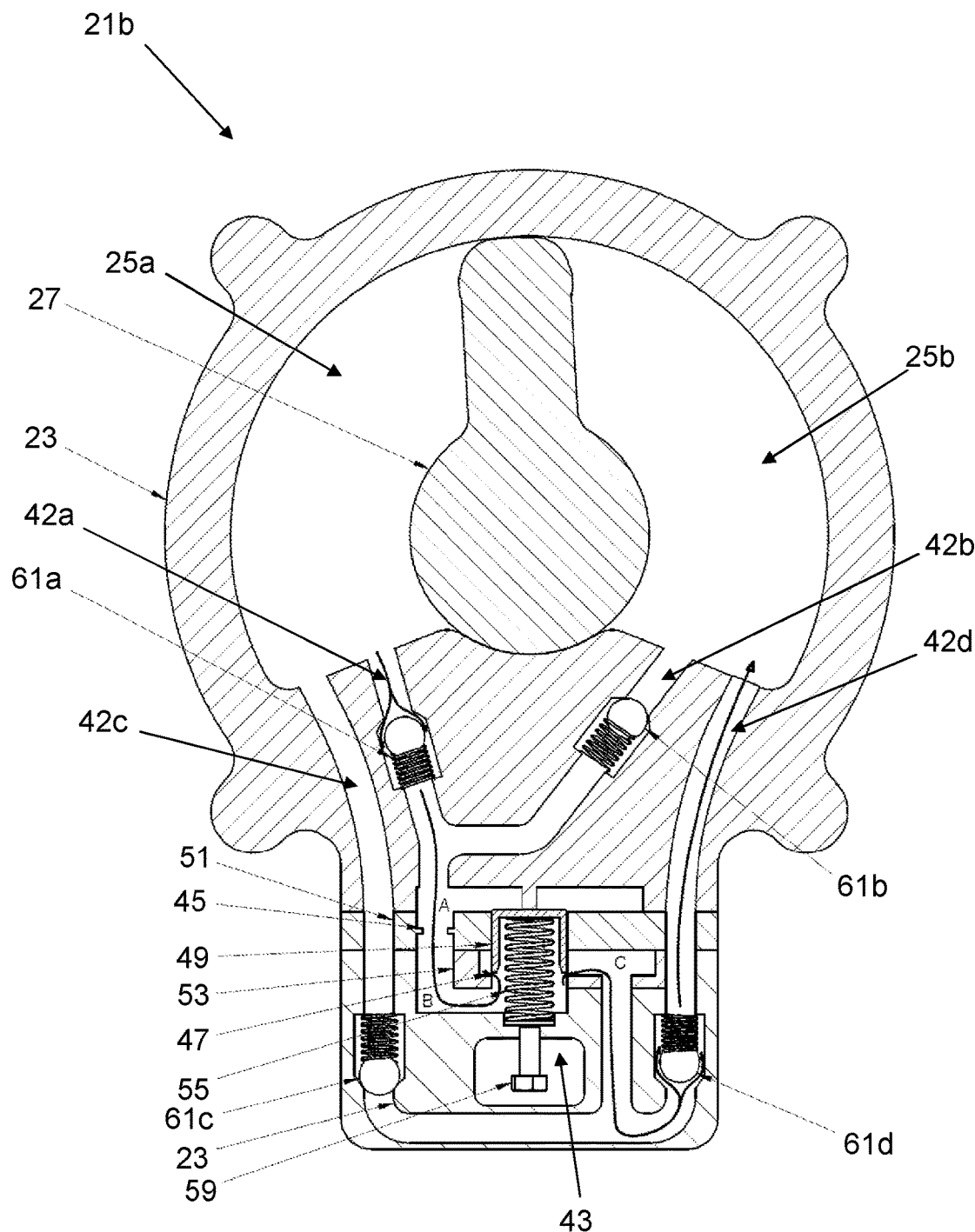
FIG. 5 is an illustration of a cross-sectional view of a second rotary damper that can be used in a gyroscopic stabiliser according an embodiment of the present invention.
Figure 6:
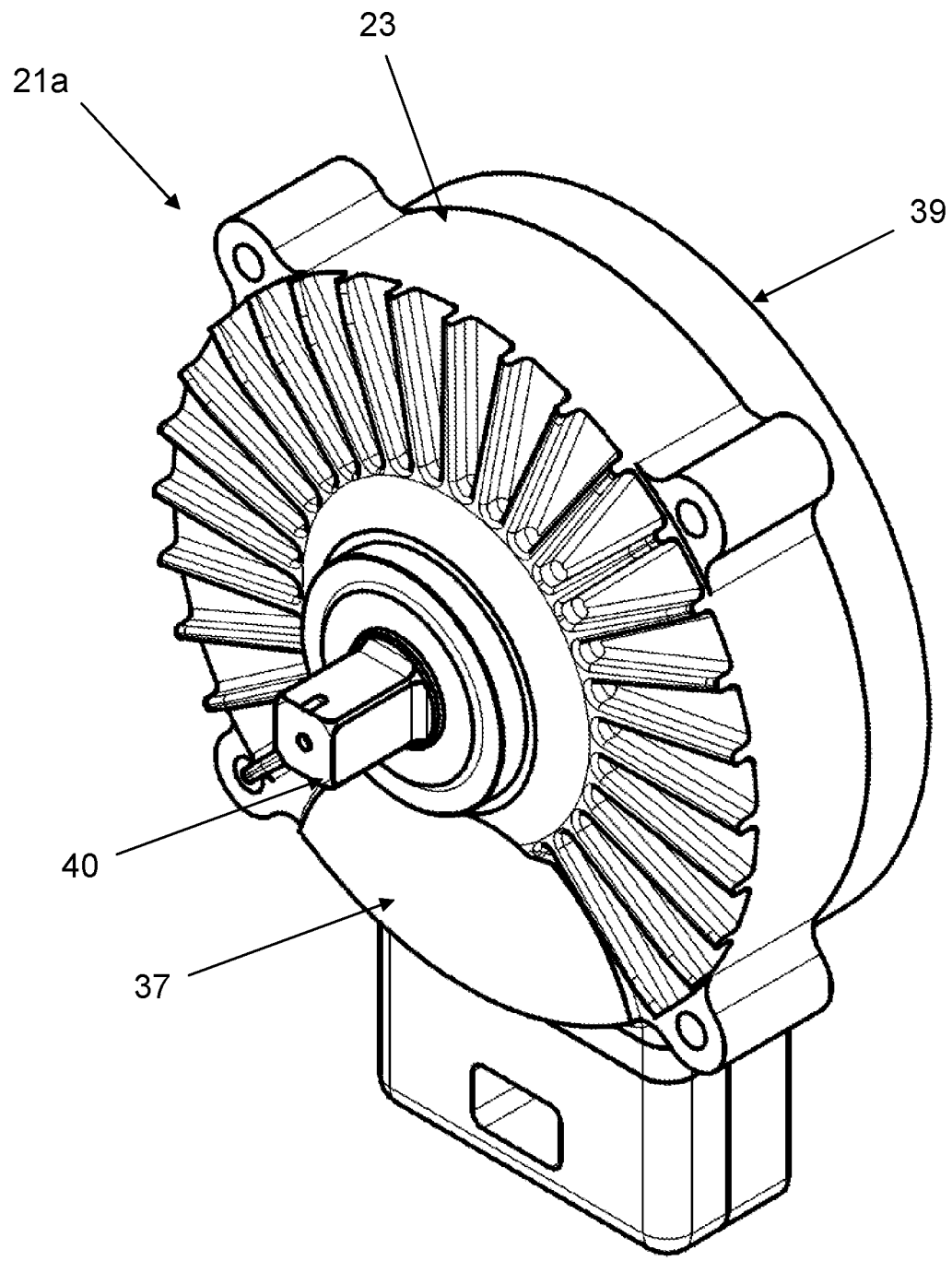
FIG. 6 is an illustration of a perspective view of the second rotary damper.

A second example of a rotary damper 21b that can be used as the rotary damper 21 in the present invention is illustrated in FIG. 5 and FIG. 6.

The rotary damper 21b differs from the rotary damper 21a in terms of the configuration of the flow passage and constant flow valve. The other features of the rotary damper 21b are the same as for the rotary damper 21a, but are not repeated here for conciseness. The rotary damper 21b may therefore have any of the features of the rotary damper 21a described above, where compatible with the description below.

The rotary damper 21b includes a constant flow valve 43 that in practice is the same as the first constant flow valve 43a in FIG. 3, and that includes the same features as the first constant flow valve 43a. Description of those features is not repeated here for conciseness.

The rotary damper 21b provides the same flow rate of fluid through the flow passage for different torques applied to the vane 27 both when the vane 27 rotates towards the first sub-chamber 25a and when the vane 27 rotates towards the second sub-chamber 25b using the single constant flow valve 43.

This is achieved by providing a plurality of sub-flow passages and valves that can be used to either (i) connect the first sub-chamber 25a to (only) the upstream side of the constant flow valve 43 (the fixed orifice 45 side) and the second sub-chamber 25b to (only) the downstream side of the constant flow valve 43 (the variable orifice 47 side), or (ii) connect the second sub-chamber 25b to (only) the upstream side of the constant flow valve 43 and the first sub-chamber 25a to (only) the downstream side of the constant flow valve 23.

In particular, as illustrated in FIG. 5, the rotary damper 21b includes a flow passage that comprises a first sub-flow passage 42a connecting the first sub-chamber 25a to the upstream side of the constant flow valve 43, a second sub-flow passage 42b connecting the second sub-chamber 25b to the upstream side of the constant flow valve 43, a third sub-flow passage 42c connecting the first sub-chamber 25a to the downstream side of the constant flow valve 43, and a fourth sub-flow passage 42d connecting the second sub-chamber 25b to the downstream side of the constant flow valve 43.

As shown in FIG. 5, a one-way flow valve 61a, 61b, 61c, 61d is positioned in each of the sub-flow passages 42a, 42b, 42c, 42d.

The one-way flow valves 61a-61d are passive one-way flow valves, that automatically allow fluid flow in one direction but prevent fluid flow in the opposite direction.

One-way flow valve 61a positioned in the first sub-flow passage 42a allows fluid flow in the first sub-flow passage 42a only in the direction from the first sub-chamber 25a to the upstream side of the flow valve 43.

One-way flow valve 61b positioned in the second sub-flow passage 42b allows fluid flow in the second sub-flow passage 42b only in the direction from the second sub-chamber 25b to the upstream side of the flow valve 43.

One-way flow valve 61c positioned in the third sub-flow passage 42c allows fluid flow in the third sub-flow passage 42c only in the direction from the downstream side of the flow valve 43 to the first sub-chamber 25a.

One-way flow valve 61d positioned in the fourth sub-flow passage 42d allows fluid flow in the fourth sub-flow passage 42d only in the direction from the downstream side of the flow valve 43 to the second sub-chamber 25b.

When the vane 27 is rotated towards the first sub-chamber 25a, the higher pressure in the first sub-chamber 25a causes valve 61a to open and valve 61c to close. The higher pressure at the upstream side of the constant flow valve 43 also causes valve 61b to close. The fluid that flows through the constant flow valve 43 from the first sub-chamber causes the valve 61d to open, so that the fluid can flow into the second sub-chamber 25b. A corresponding process occurs when the vane 27 is rotated towards the second sub-chamber 25b.

Therefore, when the vane 27 is rotated in either direction in the chamber 25, the flow rate of the flow of fluid between the two sub-chambers 25a, 25b is controlled to be substantially the same for different torques applied to rotate the vane 27. The angular velocity of the vane 27 will therefore also be substantially the same for different torques applied to rotate the vane 27.

Of course, a different arrangement of sub-flow passages and valves could be used than the specific arrangement illustrated in FIG. 5.

FIG. 6 is an illustration of a perspective view of the second rotary damper.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A gyroscopic stabiliser for stabilising motion of an object, the gyroscopic stabiliser comprising:
   a support for attaching to the object whose motion is to be stabilised;
   a gimbal rotatably supported by the support to be rotatable around a first axis relative to the support;
   a flywheel rotatably supported by the gimbal to be rotatable around a second axis relative to the gimbal, the second axis being orthogonal to the first axis; and
   a rotary damper for damping rotation of the gimbal around the first axis relative to the support;
   wherein the rotary damper comprises:
      a chamber containing a damping fluid;
      a vane that is rotatable within the chamber and that is coupled to the gimbal; and
      a flow passage allowing flow of the damping fluid from the chamber on one side of the vane to the chamber on the other side of the vane when the vane is rotated, wherein the flow passage comprises a flow valve configured to provide substantially the same flow rate of fluid through the flow passage for different torques applied to rotate the vane; and
   wherein the flow valve comprises a fixed orifice and a variable orifice in series in the flow passage, wherein a change in a pressure differential across the fixed orifice causes a change in a size of the variable orifice.

2. The gyroscopic stabiliser according to claim 1, wherein:
   the vane partitions the chamber into a first sub-chamber and a second sub-chamber on opposite sides of the vane; and
   the flow passage is between the first sub-chamber and the second sub-chamber.

3. The gyroscopic stabiliser according to claim 1, wherein the flow passage is located in a body of a housing that houses the chamber.

4. The gyroscopic stabiliser according to claim 1, wherein the gyroscopic stabiliser further comprises a plurality of valves for connecting either:
   the chamber on a first side of the vane to an upstream side of the flow valve and the chamber on a second side of the vane to a downstream side of the flow valve; or
   the chamber on the second side of the vane to the upstream side of the flow valve and the chamber on the first side of the vane to the downstream side of the flow valve.

5. The gyroscopic stabiliser according to claim 4, wherein the rotary damper comprises:
   a first flow passage connecting the chamber on the first side of the vane to the upstream side of the flow valve;
   a second flow passage connecting the chamber on the second side of the vane to the upstream side of the flow valve;
   a third flow passage connecting the chamber on the first side of the vane to the downstream side of the flow valve; and
   a fourth flow passage connecting the chamber on the second side of the vane to the downstream side of the flow valve.

6. The gyroscopic stabiliser according to claim 5, wherein the plurality of valves comprises a valve provided in each of the first to fourth flow passages.

7. The gyroscopic stabiliser according to claim 6, wherein the fixed orifice is upstream of the variable orifice.

8. The gyroscopic stabiliser according to claim 1, wherein:
   the flow valve comprises a displaceable member to which the pressure differential across the fixed orifice is applied;
   the pressure differential causes a force to act on the displaceable member that acts to displace the displaceable member in a first direction;
   the displaceable member is biased in a second direction opposite to the first direction, and
   displacement of the displaceable member changes a size of the variable orifice.

9. The gyroscopic stabiliser according to claim 8, wherein the displaceable member is linearly displaceable.

10. The gyroscopic stabiliser according to claim 8, wherein:
   the fixed orifice is between a first region and a second region of the flow passage; and the displaceable member is displaceable within a channel that connects the first region and the second region of the flow passage in parallel to the fixed orifice.

11. The gyroscopic stabiliser according to claim 8, wherein the variable orifice comprises a gap between an edge of the displaceable member and another surface, and displacement of the displaceable member changes the size of the gap.

12. The gyroscopic stabiliser according to claim 8, wherein the variable orifice comprises a fixed opening, and displacement of the displaceable member changes an extent to which the displaceable member covers the fixed opening.

13. The gyroscopic stabiliser according to claim 8, wherein the displaceable member has a first surface to which a pressure upstream of the fixed orifice is applied, and an opposite second surface to which a pressure downstream of the fixed orifice is applied.

14. The gyroscopic stabiliser according to claim 8, wherein the flow valve comprises a biasing element that applies a biasing force to the displaceable member.

15. The gyroscopic stabiliser according to claim 14, wherein:
- the displaceable member has a first surface to which a pressure upstream of the fixed orifice is applied, and an opposite second surface to which a pressure downstream of the fixed orifice is applied; and
- the biasing element applies the biasing force to the second surface of the displaceable member.

16. The gyroscopic stabiliser according to claim 14, wherein the biasing element comprises a spring.

17. The gyroscopic stabiliser according to claim 14, wherein the biasing force applied by the biasing element is adjustable.

\* \* \* \* \*